US005886436A

United States Patent [19]

Schneider et al.

[11] Patent Number: 5,886,436

[45] Date of Patent: Mar. 23, 1999

[54] HIGH-PRESSURE CLEANING APPARATUS

[75] Inventors: Josef Schneider, Backnang; Eberhard Veit, Göppingen, both of Germany; Gabriele Bonezzi, Reggio Emilia, Italy; Rudolf Guhs, Königsbronn; Johann G. Wesch, Berglen, both of Germany

[73] Assignee: Alfred Karcher GmbH & Co., Winnenden, Germany

[21] Appl. No.: 767,728

[22] Filed: Dec. 16, 1996

Related U.S. Application Data

[63] Continuation of PCT/EP96/03086 Sep 15, 1994.

[30] Foreign Application Priority Data

Jun. 17, 1994 [DE] Germany .......................... 44 21 330.1

[51] Int. Cl.[6] .............................. H02K 15/12; F04B 1/12

[52] U.S. Cl. ................................ 310/89; 310/87; 310/88; 417/423.7; 417/423.11; 417/269

[58] Field of Search ................................. 310/62, 89, 87, 310/88, 45; 417/222, 423.14, 423.15, 405, 398, 423.7, 423.11, 423.1

[56] References Cited

U.S. PATENT DOCUMENTS

| | | | |
|---|---|---|---|
| 4,260,916 | 4/1981 | Theissig | 310/50 |
| 4,484,094 | 11/1984 | Ade et al. | 310/43 |
| 4,884,952 | 12/1989 | Kanamaru et al. | 417/222 |
| 4,931,678 | 6/1990 | Lutz | 310/62 |
| 4,992,690 | 2/1991 | Baker | 310/89 |
| 5,354,181 | 10/1994 | Porel | 417/269 |
| 5,453,973 | 9/1995 | Nishio | 369/266 |

FOREIGN PATENT DOCUMENTS

| | | |
|---|---|---|
| 0 420 473 A1 | 4/1991 | European Pat. Off. . |
| 22 59 900 | 6/1974 | Germany . |
| 36 03 423 A1 | 8/1987 | Germany . |
| 88 01 028 U1 | 4/1988 | Germany . |
| 38 15 427 C2 | 1/1990 | Germany . |
| 43 08 550 A1 | 10/1993 | Germany . |
| 43 38 896 A1 | 6/1994 | Germany . |
| 93 20 361 U1 | 6/1994 | Germany . |
| 40 39 926 C2 | 8/1994 | Germany . |
| WO 92/16774 | 10/1992 | WIPO . |

*Primary Examiner*—Nestor Ramirez
*Assistant Examiner*—Timothy Williams
*Attorney, Agent, or Firm*—Barry R. Lipsitz; Ralph F. Hoppin

[57] ABSTRACT

In a high-pressure cleaning apparatus comprising an electric motor arranged in a housing, a high-pressure pump arranged in a housing with at least one piston entering a pump chamber in a sealed manner, and a swash plate carried by a motor shaft protruding from the housing of the electric motor, with the piston or pistons of the high-pressure pump resting in a resilient manner against the swash plate, in order to achieve electrical insulation in the region of the swash plate drive, it is proposed that the transition from the motor shaft via the swash plate to the piston or pistons be electrically interrupted by an electrically insulating material being interposed therebetween.

28 Claims, 2 Drawing Sheets

HIGH-PRESSURE CLEANING APPARATUS

This application is a continuation of PCT/EP94/03086 filed sep. 15, 1994.

BACKGROUND OF THE INVENTION

The invention relates to a high-pressure cleaning apparatus comprising an electric motor arranged in a housing, a high-pressure pump arranged in a housing, at least one piston entering a pump chamber in a sealed manner, and a swash plate carried by the motor shaft of the electric motor, with the piston or pistons of the high-pressure pump resting in a resilient manner against the swash plate, the transition from the motor shaft via the swash plate to the piston or pistons being electrically interrupted by an electrically insulating material interposed therebetween.

For safety reasons, it is necessary to electrically insulate the pump and the pump housing relative to the electric motor and the housing of the electric motor. In a known high-pressure cleaning apparatus in which the pistons of the high-pressure pump are driven by an eccentric drive, this is accomplished, inter alia, by the motor shaft of the electric motor carrying an eccentric being provided with a plastic covering (DE 88 01 028-U1). However, there is no hint to be found in this publication as to how this object could be accomplished specifically in a high-pressure cleaning apparatus with a swash plate drive.

It is also known, in such an axial piston pump, to design the swash plate as a molded part made of plastic material so that an electrical insulation is thereby achievable in the strand consisting of motor shaft/swash plate/piston (DE-U 9 320 361).

The object of the invention is to so design a generic high-pressure cleaning apparatus, i.e., a high-pressure cleaning apparatus with a swash plate drive, that a more complete electrical separation of the pump part and the motor part is possible.

SUMMARY OF THE INVENTION

This object is accomplished in accordance with the invention in a high-pressure cleaning apparatus of the kind described at the beginning by the housing of the electric motor consisting of a pot-shaped housing part and a component constituting part of the housing of the high-pressure pump, and by an intermediate layer of electrically insulating plastic material being arranged between the stator of the electric motor and the component of the housing.

Accordingly, with such a two-part division of the encapsulation of the motor, the electric motor is enclosed on all sides by a housing part and by the housing of the high-pressure pump, with the housing of the high-pressure pump closing the housing part on one side, for example, in the form of a cover or hood. Optimum electrical separation of the motor is now achieved by an electrically insulating intermediate layer being inserted between the stator of the electric motor, on the one hand, and this part of the pump housing which closes off the electric motor. It is thus possible to also use metallic and hence electrically conductive housings for the high-pressure pump which, nevertheless, are then electrically completely separated from the electric motor.

In accordance with a preferred embodiment, provision may, furthermore, be made for an intermediate layer of electrically insulating plastic material to be arranged between the stator of the electric motor and the pot-shaped housing part of the electric motor. Thus, a corresponding electrically insulating intermediate layer may be provided in this area of the second part of the electric motor encapsulation, too, and so this part of the encapsulation may also be made of electrically conductive material.

It is advantageous for the intermediate layer to be in the form of foil.

In particular, provision may be made for the motor shaft to consist of an electrically insulating plastic material.

In a modified embodiment, provision is made for the motor shaft to be covered with a layer of electrically insulating plastic material at least in the region in which the swash plate rests thereagainst.

In another embodiment, the motor shaft carries a cap consisting of electrically insulating plastic material in the region in which the swash plate rests thereagainst.

In a particularly preferred embodiment, provision is made for the swash plate to be held at the end face thereof by a screw on the motor shaft which rests with a head consisting of electrically insulating plastic material against the swash plate. It is thereby ensured that, on the one hand, the high strength properties of a metallic screw can be exploited, but, on the other hand, the screw does not establish electrical contact between the swash plate, on the one hand, and the motor shaft, on the other hand.

In a preferred embodiment, the screw may consist of metal and its head may be surrounded by an electrically insulating covering. It is expedient for the covering to carry on the outside thereof application surfaces for a wrench. A screw provided in this way with a plastic covering can then also be screwed-in in the usual way.

It is, furthermore, advantageous for a metallic force-transmitting element embedded in the plastic covering to be arranged on the screw. This can be, for example, a washer with a larger outer diameter than the head of the screw.

It is also advantageous for the covering to be injection molded onto the head of the screw, i.e., for the head and possibly also the force-transmitting element to be jointly embedded by injection molding.

In a further preferred embodiment, the swash plate consists of an electrically insulating plastic material.

Provision may also be made for the swash plate to receive an abutment disc against which the piston or pistons rest, and for the abutment disc to consist of electrically insulating plastic material. In these embodiments, metallic connections may be used between the swash plate and the motor shaft, and the motor shaft itself may also be of metallic design.

A further possibility of electrical separation is obtained by the pistons consisting of electrically insulating plastic material or being sheathed by an electrically insulating plastic material.

The measures explained above may, of course, also be used in combination.

Furthermore, provision may be made for an intermediate layer of electrically insulating plastic material to be arranged between the housing of the pump and the housing part of the electric motor.

This intermediate layer is preferably in the form of a ring.

This ring may carry projections which lie between the projections of the housing of the pump and the housing part of the electric motor. These projections are thereby also electrically insulated from one another.

Provision is made for the projections to be connected to each other by a screw which consists of metal and is surrounded by a jacket of electrically insulating plastic material in such a way that the metallic part of the screw is electrically separated at least from one of the projections. It is expedient for the jacket to be an insert sleeve into which the screw is inserted.

In this way, perfect electrical separation is also achieved between the housings of the electric motor and the pump even when these parts are connected to each other by metallic screws.

In a further preferred embodiment, the housing of the pump may be provided with a covering of electrically insulating plastic material or itself consist of electrically insulating plastic material.

Furthermore, it is advantageous for a chamber for receiving electrical leads and/or switching elements to adjoin the housing of the pump and to be electrically separated from the housing of the pump by an electrically insulating plastic material interposed therebetween. In this way, complete electrical insulation from the pump and the pump housing is also achieved in the area of the electrical supply lines and so a high-pressure cleaning apparatus constructed in accordance with the above description meets increased safety requirements.

The following description of preferred embodiments of the invention serves in conjunction with the drawings to explain the invention in further detail.

DETAILED DESCRIPTION OF THE INVENTION

Figure 1:
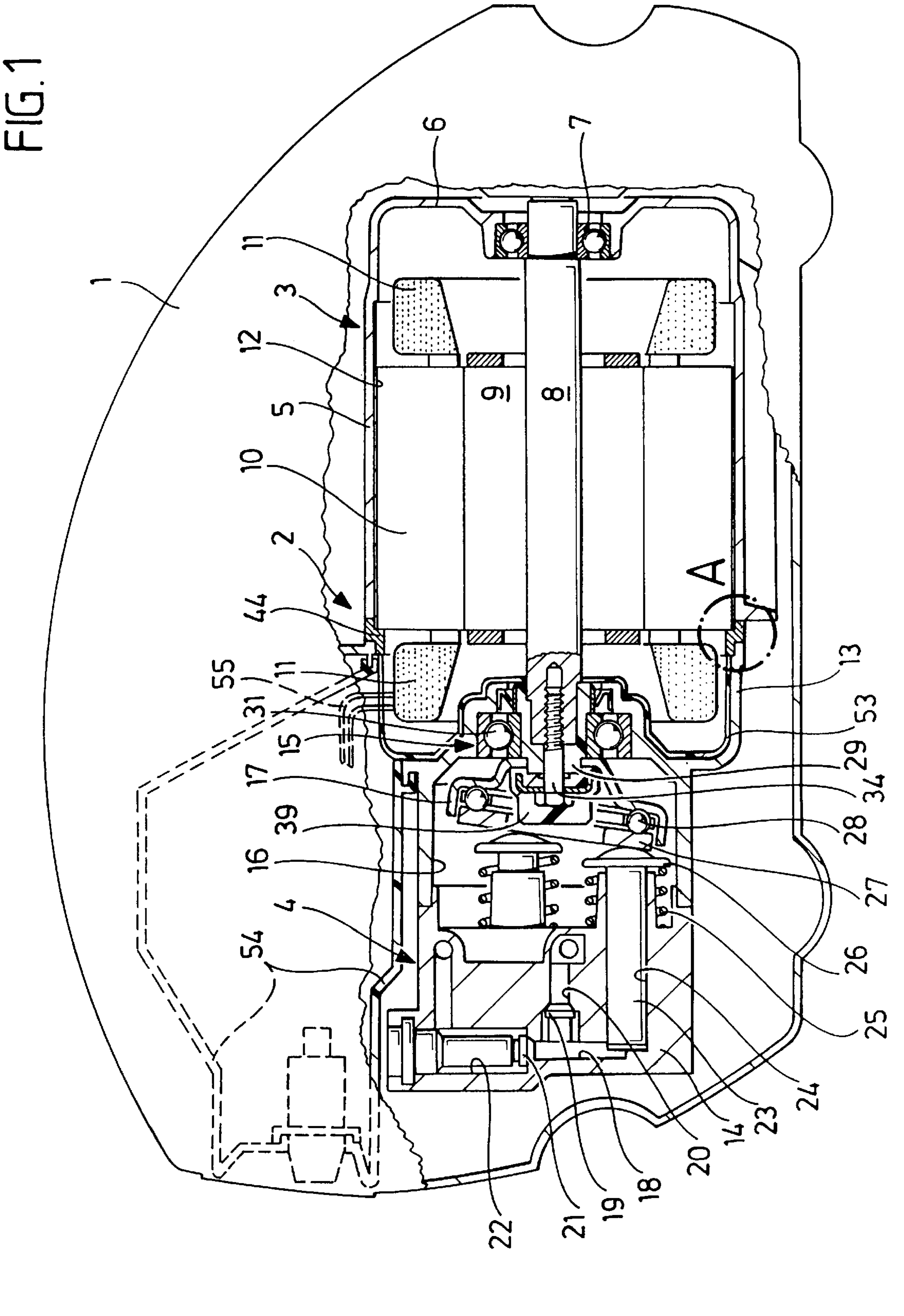
FIG. 1 a side view of a high-pressure cleaning apparatus in a partly broken open illustration, with a motor pump unit shown in section in the longitudinal direction.
Figure 2:
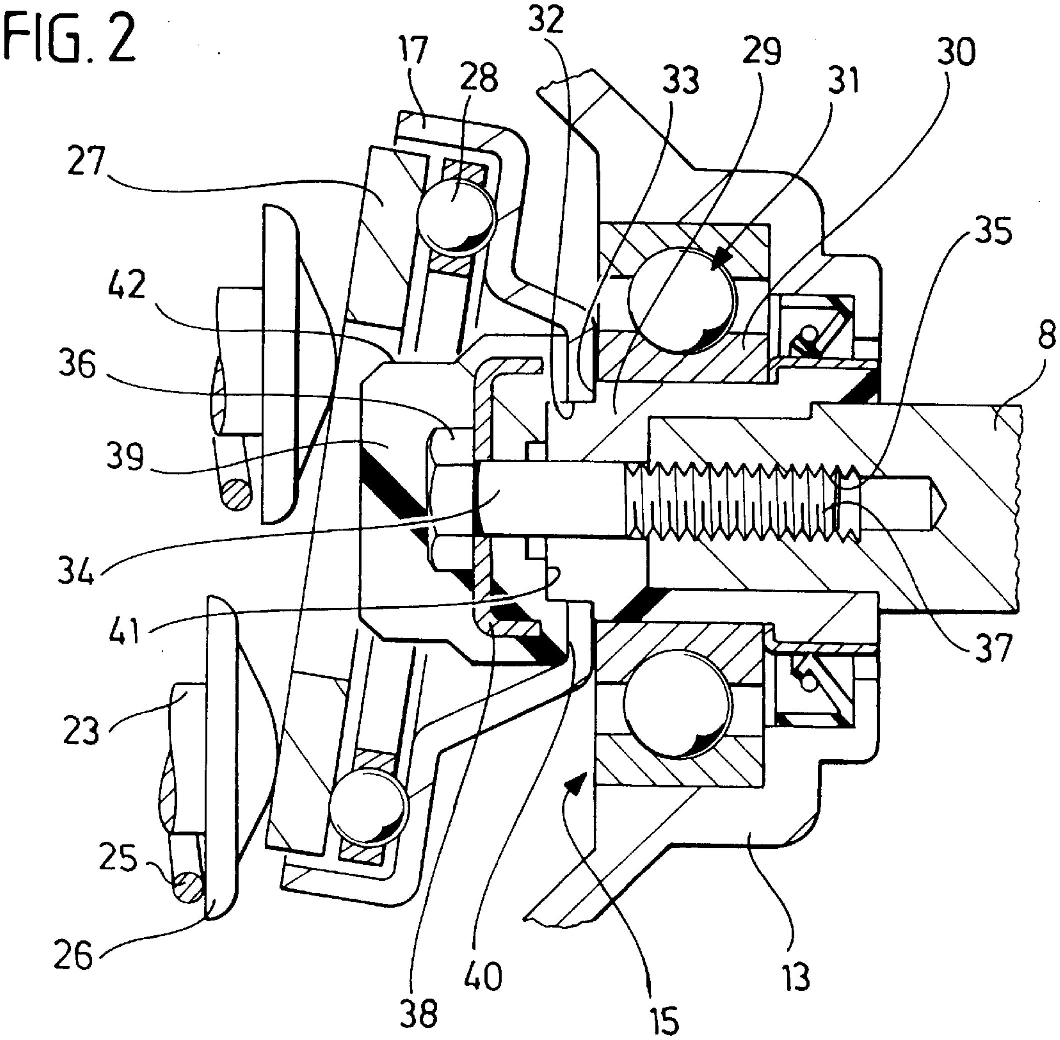
FIG. 2 a longitudinal sectional view through the swash plate drive of the motor pump unit of FIG. 1.

A motor pump unit 2 comprising an electric motor 3 and a high-pressure pump 4 is arranged in a housing 1 of a high-pressure cleaning apparatus. The electric motor 3 is positioned in a pot-shaped housing 5 having at the bottom 6 a central rotary bearing means 7 for a motor shaft 8 which is part of a rotor 9. The rotor 9 is surrounded by a stator 10 with a stator winding 11. Inserted between the stator 10 and the housing 5 of the electric motor is a foil 12 made of an electrically insulating plastic material so the stator is completely insulated relative to the housing 5 of the electric motor.

The end of the motor shaft 8 opposite the bearing means 7 and also one of the two stator windings 11 protrude from the housing 5 of the electric motor 3 and are covered in this area by a hood 13 which is part of a housing 14 of the high-pressure pump 4. The hood 13 receives a rotary bearing means 15 for the motor shaft 8 so the motor shaft 8 is mounted between the bearing means 7 and 15. It extends through the bottom of the hood 13 and protrudes into a swash plate chamber 16 in the interior of the housing 14. The motor shaft 8 is connected there to a swash plate 17 which serves as drive means for the high-pressure pump 4.

This high-pressure pump 4 comprises several pump chambers 18, only one of which is illustrated in FIG. 1. This pump chamber 18 communicates via an inlet valve 19 with a suction line 20 and via an outlet valve 21 with a pressure line 22. A cylindrical piston 23 which is mounted for displacement in a guide means 24 protrudes into the pump chamber 18. The piston 23 is pressed against a ring-shaped abutment disc 27 by a helical spring 25 which concentrically surrounds the guide means and the piston and is supported, on the one hand, at the pump chamber 18 and, on the other hand, at a supporting collar 26 of the piston 23. The abutment disc 27 is mounted for rotation in the swash plate via a ball bearing 28 so that upon rotation of the motor shaft and thus of the swash plate, the pistons pressed against the abutment disc 27 are oscillatingly displaced in the guide means.

In the area of the rotary bearing means 15, the motor shaft 8 carries a cap 29 made of electrically insulating plastic material which extends over its end. The cap 29 engages in the inner ring 30 of a ball bearing 31 which forms the rotary bearing means 15. This prevents an electrical connection between the motor shaft 8, on the one hand, and the rotary bearing means 15, on the other hand, and thus also an electrical connection between the motor shaft 8, on the one hand, and the housing 14 of the high-pressure pump, on the other hand.

With a central recess 32, the swash plate 17 embraces the front end of the cap 29 and positions itself against a step 33 of this cap 29. The recess 32 and the front end of the cap 29 can be of non-circular configuration so that swash plate and motor shaft are thereby rotationally fixedly connected to each other.

In this position, the swash plate is held by a tightening screw 34 on the motor shaft 8. This tightening screw 34 is screwed at the end face thereof into a threaded bore 35 of the motor shaft 8. The tightening screw 34 consists of metal and carries between its head 36 and the threaded area 37 a supporting disc 38, the outer diameter of which is larger than that of the head 36. The head 36 and the supporting disc 38 are jointly surrounded by an electrically insulating plastic material which has the shape of a larger head 39 and embeds the upper part of the tightening screw 34 within it. With its underside 40, this head 39 lies against the swash plate 17 and presses it axially against the motor shaft 8. The swash plate 17 is thereby fixed on the motor shaft. The underside 40 has a central recess 41 in which the cap 29 engages with the front part thereof. This results in a continuous jacket of electrically insulating plastic material in the area of the end of the motor shaft 8 and the tightening screw 34. In this area, no metal parts are accessible from the outside. In this way, the swash plate and the housing of the motor are electrically fully insulated from the motor shaft.

The head 39 may carry on the sides thereof application surfaces 42 for a wrench, for example, the head may have a hexagonal cross section.

The free rim 43 of the hood 13 adjoins the rim of the housing 5 of the electric motor via an interposed ring 44 made of electrically insulating plastic material. This ring 44 thus insulates the housing 5 of the electric motor from the hood 13 and hence from the housing 14 of the pump.

Figure 3:
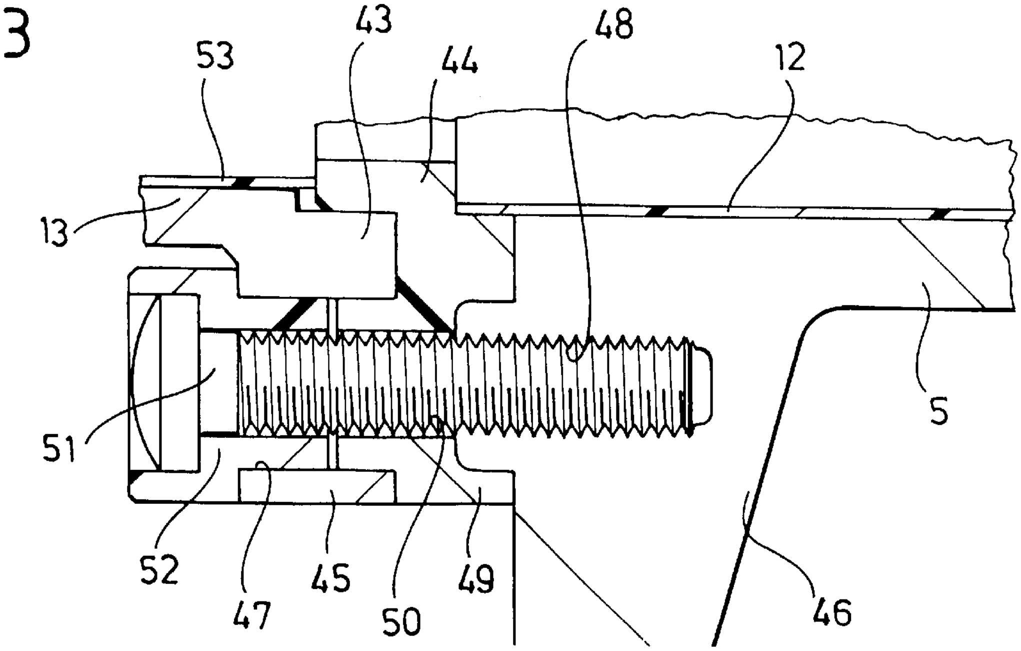
FIG. 3 an enlarged longitudinal sectional view in the area in which the housings of the electric motor and the pump are connected.

In order to connect the hood, on the one hand, and the housing of the electric motor, on the other hand, to each other, both parts carry side projections 45, 46 (FIG. 3), one of which has a through-bore 47 and the other an internally threaded bore 48. The ring 44 also has in the area of the projections 45 and 46 side projections 49 which are arranged between the projections 45 and 46 and separate these electrically from each other. Also arranged in the area of the projection 49 is a through-bore 50 which is in alignment with the through-bore 47 and the internally threaded bore 48.

A tightening screw 51 is inserted into the through-bores 47 and 50 and screwed into the internally threaded bore 48. A sleeve 52 made of electrically insulating plastic material is positioned on the upper part of this tightening screw 51. The sleeve 52 surrounding the tightening screw 51 protrudes into the through-bore 47 of the one projection 45 and thereby electrically separates the tightening screw 51, which consists of metal, from the projection 45. This construction ensures that there is also no electrically conductive connection through the projections and the tightening screws in the connecting area of the housing 5 and the housing 14, although the housings and the screw can consist of electrically conductive material, in particular, of metal.

The electrical separation of the electric motor and the pump can be further improved by the stator winding 11 facing the high-pressure pump 4 also being covered relative to the hood 13 and thus relative to the housing 14 with a foil 53 consisting of electrically non-conductive* plastic material. As illustrated in FIG. 1, this can be laid so as to extend along the hood, but it is also possible to cover the stator winding 11 with an appropriate foil.

*translator's note: German text erroneously reads "conductive".

Adjoining the housing 14 of the pump is a chamber 54 which receives electrical leads 55 or switching elements. This chamber either consists itself of electrically insulating plastic material or it is fixed in an electrically separated manner on the housing 14 of the pump with electrically insulating plastic material interposed therebetween so that the lines 55 and electrical switching elements in the interior of the chamber 54 are electrically insulated by the chamber itself relative to the housing 14 of the pump.

In particular, polyamides, polyesters, polyurethanes or various thermosetting plastics can be used as electrically insulating plastic material.

What is claimed is:

1. A high-pressure cleaning apparatus, comprising:

an electric motor with a stator arranged in a motor housing for driving a motor shaft;

said motor housing comprising a first portion which extends circumferentially about said stator;

a high-pressure pump which is adapted to be driven by said motor shaft and which has at least one piston and pump chamber arranged in a pump housing;

said pump housing comprising a second portion which extends circumferentially about said at least one piston and pump chamber;

a metallic hood component which forms a common end portion of said motor housing and said pump housing;

said hood component receiving a rotary bearing means for supporting said motor shaft;

said hood component extending substantially from said rotary bearing means toward said first portion of said motor housing for closing an end of said motor housing, and toward said second portion of said pump housing for closing an end of said pump housing;

an electrically insulating material interposed between said motor shaft and said at least one piston and pump chamber; and an intermediate layer of electrically insulating material that extends, at least in part, along said hood component on a side of said hood component that faces said stator; wherein:

said electrically insulating material and said intermediate layer of electrically insulating material serve to electrically separate said high pressure pump and said electric motor.

2. A high-pressure cleaning apparatus as defined in claim 1, wherein:

said hood component is unitary with said second portion of said pump housing.

3. A high-pressure cleaning apparatus as defined in claim 1, wherein:

said hood component has a free rim that is adapted to be secured to said first portion of said motor housing for closing said end of said motor housing.

4. A high-pressure cleaning apparatus as defined in claim 3, further comprising:

an insulative ring interposed between said free rim and said first portion of said motor housing.

5. A high-pressure cleaning apparatus as defined in claim 1, wherein:

said first portion comprises a pot-shaped housing part which extends circumferentially about said stator; and an intermediate layer of electrically insulating plastic material is arranged between said stator and said pot-shaped housing part.

6. A high-pressure cleaning apparatus as defined in claim 1, wherein:

said intermediate layer is in the form of foil.

7. A high-pressure cleaning apparatus as defined in claim 1, wherein:

said first portion comprises a pot-shaped housing part which extends circumferentially about said stator; and an intermediate layer of electrically insulating plastic material is arranged between said pump housing and said housing part.

8. A high-pressure cleaning apparatus as defined in claim 7, wherein:

said intermediate layer of electrically insulating plastic material is in the form of a ring.

9. A high-pressure cleaning apparatus as defined in claim 8, wherein:

said ring carries projections which lie between projections of said pump housing and said housing part, respectively.

10. A high-pressure cleaning apparatus as defined in claim 9, wherein:

said projections are connected to each other by a screw which comprises metal and is surrounded by a jacket of electrically insulating plastic material in such a way that the metallic part of said screw is electrically separated at least from one of said projections.

11. A high-pressure cleaning apparatus as defined in claim 10, wherein:

said jacket is an insert sleeve into which said screw is inserted.

12. A high-pressure cleaning apparatus as defined in claim 1, wherein:

said motor shaft comprises electrically insulating plastic material.

13. A high-pressure cleaning apparatus as defined in claim 1, wherein:

said high-pressure pump comprises a swash plate, with said at least one piston resting in a resilient manner against said swash plate; and said motor shaft is covered with a layer of electrically insulating plastic material at least in a region against which said swash plate rests.

14. A high-pressure cleaning apparatus as defined in claim 1, wherein:

said high-pressure pump comprises a swash plate, with said at least one piston resting in a resilient manner against said swash plate; and said motor shaft carries a cap made of electrically insulating plastic material in a region against which said swash plate rests.

15. A high-pressure cleaning apparatus as defined in claim 1, wherein:

said high-pressure pump comprises a swash plate, with said at least one piston resting in a resilient manner against said swash plate;

said swash plate is held at an end face thereof by a screw on said motor shaft; and said screw has a head comprising electrically insulating plastic material which rests against said swash plate.

16. A high-pressure cleaning apparatus as defined in claim 15, wherein:

said screw comprises metal and its head is surrounded by an electrically insulating covering.

17. A high-pressure cleaning apparatus as defined in claim 16, wherein:

an exterior of said covering carries application surfaces for a wrench.

18. A high-pressure cleaning apparatus as defined in claim 16, wherein:

a metallic force-transmitting element embedded in said covering is arranged on said screw.

19. A high-pressure cleaning apparatus as defined in claim 18, wherein:

said covering is injection molded onto said head of said screw.

20. A high-pressure cleaning apparatus as defined in claim 1, wherein:

said high-pressure pump comprises a swash plate, with said at least one piston resting in a resilient manner against said swash plate; and said swash plate comprises electrically insulating plastic material.

21. A high-pressure cleaning apparatus as defined in claim 1, wherein:

said high-pressure pump comprises a swash plate; and said swash plate receives an abutment disc against which said at least one piston rests; and said abutment disc comprises electrically insulating plastic material.

22. A high-pressure cleaning apparatus as defined in claim 1, wherein:

said at least one piston comprises electrically insulating plastic material or is sheathed with an electrically insulating plastic material.

23. A high-pressure cleaning apparatus as defined in claim 1, wherein:

said pump housing is provided with a covering of electrically insulating plastic material.

24. A high-pressure cleaning apparatus as defined in claim 1, wherein:

said pump housing comprises an electrically insulating plastic material.

25. A high-pressure cleaning apparatus as defined in claim 1, wherein:

a chamber for receiving electrical leads and/or switching elements adjoins said pump housing, said chamber being electrically separated from said pump housing by an electrically insulating plastic material being interposed therebetween, or said chamber itself comprising an electrically insulating plastic material.

26. A high-pressure cleaning apparatus as defined in claim 5, wherein:

said intermediate layer is in the form of foil.

27. A high-pressure cleaning apparatus as defined in claim 14, wherein:

said swash plate is held at an end face thereof by a screw on said motor shaft which rests with a head comprising electrically insulating plastic material against said swash plate.

28. A high-pressure cleaning apparatus as defined in claim 1, wherein:

said intermediate layer of electrically insulating material comprises plastic.

* * * * *

UNITED STATES PATENT AND TRADEMARK OFFICE

CERTIFICATE OF CORRECTION

PATENT NO. : 5,886,436

DATED : March 23, 1999

INVENTOR(S) : Schneider et al.

It is certified that error appears in the above-identified patent and that said Letters Patent is hereby corrected as shown below:

On the title , item [63] Continuation of PCT/EP96/03086 SEP. 15, 1994, should read:

-- [63] Continuation of PCT/EP94/03086 SEP. 15, 1994. --.

Signed and Sealed this

Thirty-first Day of August, 1999

Attest:

Q. TODD DICKINSON

*Attesting Officer* *Acting Commissioner of Patents and Trademarks*